United States Patent
Al-Odail et al.

(10) Patent No.: US 10,255,797 B1
(45) Date of Patent: Apr. 9, 2019

(54) INTEGRATED ALARM MANAGEMENT SYSTEM (ALMS) KPIS WITH PLANT INFORMATION SYSTEM

(71) Applicant: Saudi Arabian Oil Company, Dhahran (SA)

(72) Inventors: Anwar R. Al-Odail, Dhahran (SA); Ziyad M. Al-Yahya, Dhahran (SA)

(73) Assignee: SAUDI ARABIAN OIL COMPANY (SA)

( * ) Notice: Subject to any disclaimer, the term of this patent is extended or adjusted under 35 U.S.C. 154(b) by 0 days.

(21) Appl. No.: 15/878,878

(22) Filed: Jan. 24, 2018

(51) Int. Cl.
 *G08B 29/00* (2006.01)
 *G08B 29/02* (2006.01)
 *H04L 29/08* (2006.01)

(52) U.S. Cl.
 CPC ........... *G08B 29/02* (2013.01); *H04L 67/12* (2013.01)

(58) Field of Classification Search
 CPC ........ G08B 29/00; G08B 29/02; G08B 29/04; G08B 29/12; G08B 29/20; G05B 11/01; G06F 15/00; G06F 15/173; G06F 11/30; G06F 19/00; H04L 29/06; H04L 63/0236
 USPC ............ 340/506, 507, 517, 521; 700/79, 83; 702/183, 188; 709/238, 242; 726/3, 13
 See application file for complete search history.

(56) References Cited

U.S. PATENT DOCUMENTS

| | | | | |
|---|---|---|---|---|
| 6,853,959 B2* | 2/2005 | Ikeda | ................. | G05B 23/0264 702/188 |
| 7,206,646 B2* | 4/2007 | Nixon | .................. | C10G 11/187 700/79 |
| 7,557,702 B2* | 7/2009 | Eryurek | ............... | G05B 23/027 340/511 |
| 7,805,279 B2* | 9/2010 | Ogushi | ............... | G03F 7/70525 702/184 |
| 8,040,230 B2* | 10/2011 | Okada | ................ | G05B 23/0272 340/506 |
| 8,073,967 B2* | 12/2011 | Peterson | ............... | H04L 67/306 709/238 |
| 2005/0004781 A1 | 1/2005 | Price et al. | | |
| 2013/0326610 A1* | 12/2013 | Al-Khabbaz | ....... | H04L 63/0209 726/13 |
| 2014/0336984 A1 | 11/2014 | Starr | | |

OTHER PUBLICATIONS

Labs, "Manufacturing Intelligence: Using the Right Tools to Make the Right Decisions", Food Engineering, vol. 86, No. 1, Jan. 2014, pp. 84-86, 88, 90, 92, 94, 96, 98.

\* cited by examiner

Primary Examiner — Hung T Nguyen
(74) Attorney, Agent, or Firm — Bracewell LLP; Constance Gall Rhebergen

(57) ABSTRACT

An improved alarm management system ("ALMS") is described. In an embodiment, the improved alarm management system is configured to include a control system connected to multiple field devices in communication with an alarm management analysis system. The alarm management analysis system and control system can further be configured to communicate with the PI interface of a plant network. In a further embodiment, data from multiple ALMS can be aggregated offsite, processed, and configured to be displayed to offsite personnel.

13 Claims, 6 Drawing Sheets

INTEGRATED ALARM MANAGEMENT SYSTEM (ALMS) KPIS WITH PLANT INFORMATION SYSTEM

FIELD

Embodiments of the present disclosure relate to alarm management systems for operating organizations.

BACKGROUND

Alarm Management Systems ("ALMS") are considered an important layer of protection for operating organizations. In general ALMS helps operating organization personnel, such as at manufacturing or processing plant, to detect abnormal plant conditions in the early stages which allows those conditions to be addressed and rectified before they turn into larger issues. ALMS can also provide an organization management team or onsite personnel with data that indicates the general health and well-being of a particular plant. This can help onsite personnel and management to make decisions about staffing, plant renovation projects, repair part inventories, and many other decisions that involve the allocation of resources and expenditures for a particular plant.

In general, plants can be configured with field devices that may include various sensors, cameras, temperature sensors, level sensors, flow sensors, valves, switches, vibration sensors, liquid detection sensors, and many other similar devices. These sensors and devices can communicate information via wired connections or wirelessly to data acquisition hubs, remote computer systems, central computer systems, etc. Often, pre-configured alarm levels will be configured as part of a software program running on a computer system. When a particular sensor or device conveys data that would "trip" or exceed the bounds of the pre-configured alarm levels, an alarm is triggered. Once triggered an alarm can be relayed to onsite personnel or displayed on a computer display terminal or other user display. Such alarms allow onsite personnel to manage potential issues over large geographic areas or with complex equipment or both. When an alarm is triggered, personnel can be alerted and deployed to assess and fix potential issues with the plant. Often times alarm values will be set to levels that will alert plant personnel to a minor issue that can be fixed, such as by replacing a component on the brink of failure, before the issue turns into something that would cause longer downtime for a particular system. Alarm Management Systems, when designed and functioning well, can help a plant to be more reliable and have extended uptime intervals.

Current Alarm Management Systems are often managed by an individual onsite control systems engineer and plant reports are often manually compiled by this engineer. These reports can be compiled on a daily, weekly, or monthly basis depending on the engineers time and direction by management. Manually assembling a report is often time consuming for the control systems engineer. It would thus be desirable for a system to generate an alarm report automatically with limited or no interaction from the control systems engineer.

SUMMARY

Embodiments of the present disclosure aim to provide an improved Alarm Management System ("ALMS"). In general, embodiments of the system provide a way to measure and manage the performance of ALMS in a more efficient and effective way. Embodiments of the improved system are described and configured to allow for the generation of periodic automatic reporting from a particular ALMS installation. Various embodiments also describe a ALMS consolidation system that receives and gathers reports from various individual ALMS, processes and organizes the reports, and then displays consolidated reporting information to an end user. Such a system is intended to assist offsite management personnel to better track, monitor, coordinate and interact with local onsite ALMS engineers and also enables offsite management to access real time or near real time status updates regarding the states of various individual ALMS.

In addition, embodiments of the improved system allow for multiple scattered operating facilities from different plant network levels to be connected together to a centralized location and monitored remotely.

In an embodiment, this solution can utilize a PI system interface with ALMS to achieve the abovementioned objectives. PI is a system that collects data form various systems such as control systems and is configured to retain historical data from these systems. This can include establishing new connection between the two systems by using the OLE for Process Control ("OPC") communication protocol. This approach can allow ALMS to generate certain alarm KPIs periodically such that they can be pushed to the PI. Plant personal can=observe the performance of their plant any time using PI without the need to wait for a control engineer to publish a report. Moreover, in certain embodiments, PI access privilege can be expanded to allow corporate engineers observe the performance of multiple operating organizations through one interface or even at one time depending on the particular display configuration desired.

In an embodiment, a plant alarm management system can be configured that comprises: an alarm management analysis computer system and a control computer system that further comprising: one or more input/output cards configured with an input/output controller; and multiple field devices, each including sensors to detect plant conditions, each of the one or more field devices configured to communicate data regarding plant state to the one or more input/output cards configured as part of the control computer system. In an embodiment, the plant alarm management system can further be configured to comprise a PI interface computer system configured to be in communication over a network with each of the alarm management system and the control computer system.

In an embodiment, a plant alarm management system can be further configured such that the communication channel between the alarm management analysis computer system and the control computer system comprises an OPC server.

In an embodiment, a plant alarm management system can be further configured such that the communication channel between the alarm management analysis computer system and the PI interface computer system comprises an OPC server.

In an embodiment, a plant alarm management system can be further configured such that the communication channel between the control computer system and the PI interface computer system comprises an OPC server.

In an embodiment, a plant alarm management system can be further configured such that the communication channel between the control computer system and the PI interface computer system comprises an OPC server and wherein the communication channel between the alarm management analysis computer system and the PI interface computer system comprises a second OPC server and wherein the communication channel between the alarm management analysis computer system and the control computer system comprises a third OPC server.

In an embodiment, a plant alarm management system can be further configured such that the multiple field devices, each include sensors to detect plant conditions and can include one or more of each of the following field device types: a temperature sensor, a pressure sensor, a level sensor, a flow sensor, a valve, a switch.

In an embodiment, a corporate plant alarm management system can be configured that comprises multiple separate plant level alarm management systems, each separate plant level alarm management system can be further configured to comprise: an alarm management analysis computer system, a control computer system further configured with one or more input/output cards; and multiple field devices, each including sensors to detect plant conditions, each of the one or more field devices configured to communicate data regarding plant state to the one or more input/output cards configured as part of the control computer system, the control system further configured to store state data for each of the multiple field devices. In an embodiment, each plant level alarm management system can further be configured with a PI interface computer system configured to be in communication over a network with each of the alarm management system and the control computer system.

In an embodiment, a corporate plant alarm management system can be further configured such that each of the separate plant level alarm management systems are configured to communicate alarm data and alarm related information over an IT network to a corporate PI system configured at a remote location.

In an embodiment, a corporate plant alarm management system can be further configured such that the corporate PI system is configured to communicate alarm data and alarm related information to an alarm engineering center system for organization and display of the alarm data and alarm related information.

In an embodiment, a corporate plant alarm management system can be further configured such that for each of the respective separate plant alarm management systems, the communication channel between the control computer system and the PI interface computer system comprises a first OPC server and wherein the communication channel between the alarm management analysis computer system and the PI interface computer system comprises a second OPC server and wherein the communication channel between the alarm management analysis computer system and the control computer system comprises a third OPC server.

In an embodiment, a corporate plant alarm management system can be further configured such that for each of the respective separate plant alarm management systems, the multiple field devices, each including sensors to detect plant conditions, can include one or more of each of the following field device types: a temperature sensor, a pressure sensor, a level sensor, a flow sensor, a valve, or a switch.

In an embodiment, a plant alarm management system can be configured that comprises: an alarm management analysis computer system and a control computer system further comprising: one or more input/output cards configured with an input/output controller; and multiple field devices, each including sensors to detect plant conditions, each of the one or more field devices configured to communicate data regarding plant state to the one or more input/output cards configured as part of the control computer system. In an embodiment, the plant alarm management system can further be configured with a PI interface computer system configured to be in communication over a network with each of the alarm management system and the control computer system, where the communication channel between the control computer system and the PI interface computer system is configured to direct alarm data and alarm related information through an OPC server, the communication channel between the alarm management analysis computer system and the PI interface computer system is configured to direct alarm data and alarm related information through a second alternate channel of the same OPC server, and the communication channel between the alarm management analysis computer system and the control computer system is configured to direct alarm data and alarm related information through a third channel of the same OPC server.

In an embodiment, a plant alarm management system can be further configured such that the multiple field devices can include one or more of each of the following field device types: a temperature sensor, a pressure sensor, a level sensor, a flow sensor, a valve, or a switch.

In an embodiment, a plant alarm management system can be further configured such that the multiple field devices can convey information regarding the health of the field device, such as if the device is in an error state.

In an embodiment, a plant alarm management system can be further configured such that the multiple field devices are each configured with wireless communication channels to communicate plant conditions information to the control computer system wirelessly, the control computer system also being configured with wireless communication channels to receive the plant conditions information.

BRIEF DESCRIPTION OF THE DRAWINGS

The foregoing aspects, features, and advantages of embodiments of the present disclosure will further be appreciated when considered with reference to the following description of embodiments and accompanying drawings. In describing embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose.

DETAILED DESCRIPTION

Figure 1:
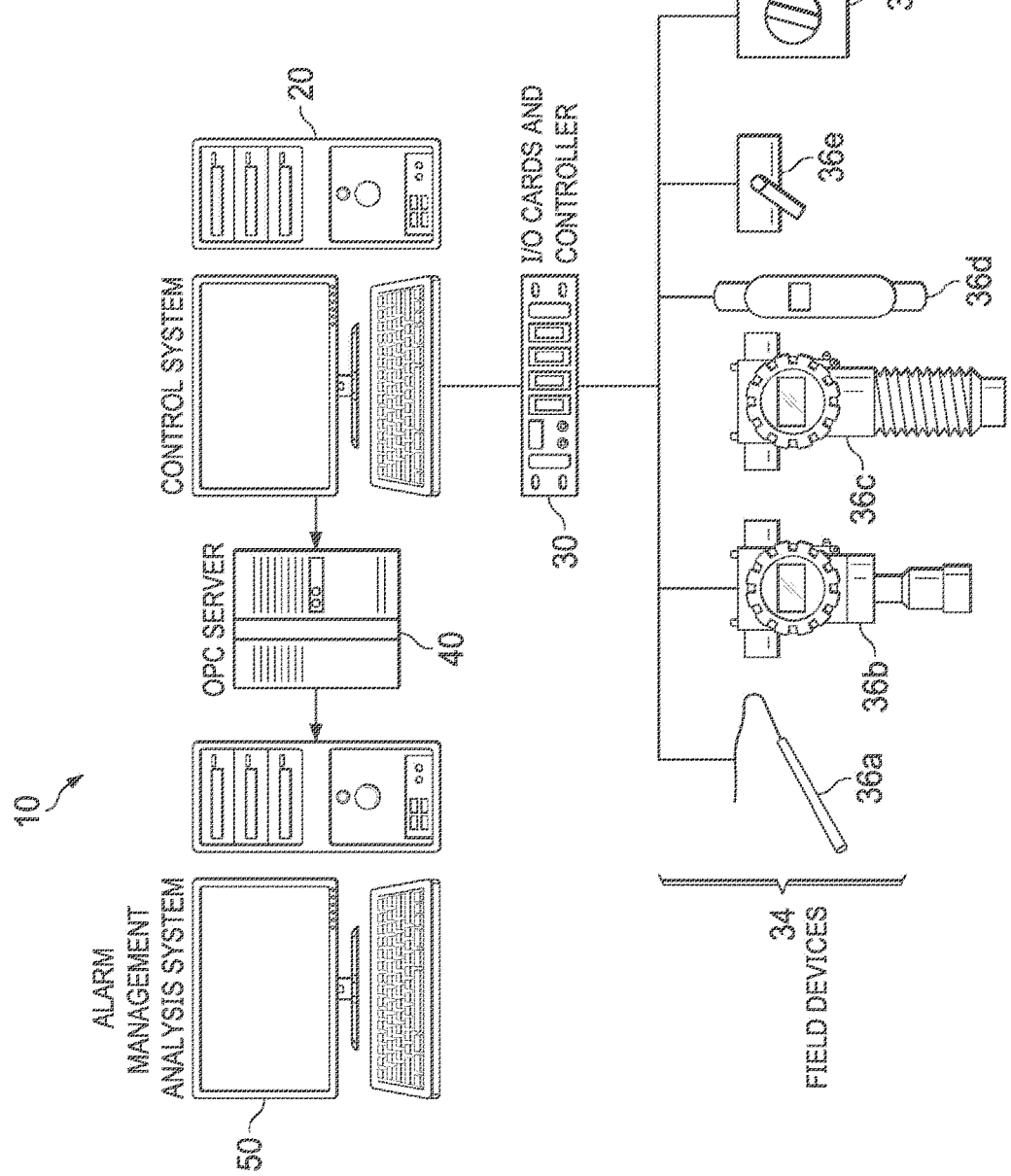
FIG. 1 illustrates a typical structure of an individual ALMS system set up to monitor a particular operating plant.

Advantages and features of the present invention and methods of accomplishing the same will be apparent by referring to embodiments described below in detail in connection with the accompanying drawings. However, the present invention is not limited to the embodiments disclosed below and may be implemented in various different forms. The embodiments are provided only for completing the disclosure of the present invention and for fully representing the scope of the present invention to those skilled in the art.

For simplicity and clarity of illustration, the drawing figures illustrate the general manner of construction, and descriptions and details of well-known features and techniques may be omitted to avoid unnecessarily obscuring the discussion of the described embodiments of the invention. Additionally, elements in the drawing figures are not necessarily drawn to scale. For example, the dimensions of some of the elements in the figures may be exaggerated relative to other elements to help improve understanding of embodiments of the present invention. Like reference numerals refer to like elements throughout the specification.

Hereinafter, various embodiments of the present invention will be described in detail with reference to the accompanying drawings.

Embodiments described below relate to an improved Alarm Management System. In general, embodiments of the system provide a way to measure and manage the performance of ALMS in a more efficient and effective way. Embodiments of the improved system are described and configured to allow for the generation of periodic automatic reporting from a particular ALMS installation. Various embodiments also describe an ALMS consolidation system that receives and gathers reports from various individual ALMS, processes and organizes the reports, and then displays consolidated reporting information to an end user. Such a system is intended to assist offsite management personnel to better track, monitor, coordinate and interact with local onsite ALMS engineers and also enables offsite management to access real time or near real time status updates regarding the states of various individual ALMS.

Referring to FIG. 1, a typical structure of an individual prior art alarm management system 10 set up to monitor a particular operating plant is shown. In this embodiment, a control system 20 connects to input/output ("I/O") cards and controller bank 30. The I/O cards and controller bank 30 can be connected to a wide variety of I/O field devices 34 that can be configured in a particular plant. The field devices 234 can include a variety of sensors and devices such as a temperature sensor 36a, a pressure sensor 36b, a level sensor 36c, a flow sensor 36d, a valve 36e, and a switch 36f. The control system 20 can be configured to connect to an OPC Server 40. In an embodiment, an OPC server can be a separately configured piece of hardware running an OPC Server software program, though an OPC Server is often more simply configured as a software program that can run on the control system 20 or an alarm management analysis system 50. The OPC Server converts field device I/O information into open source OPC protocol information that can be understood by a wide variety of computer programs including the types of programs that can be run on alarm management analysis systems such as the system shown in FIG. 1.

Figure 2:
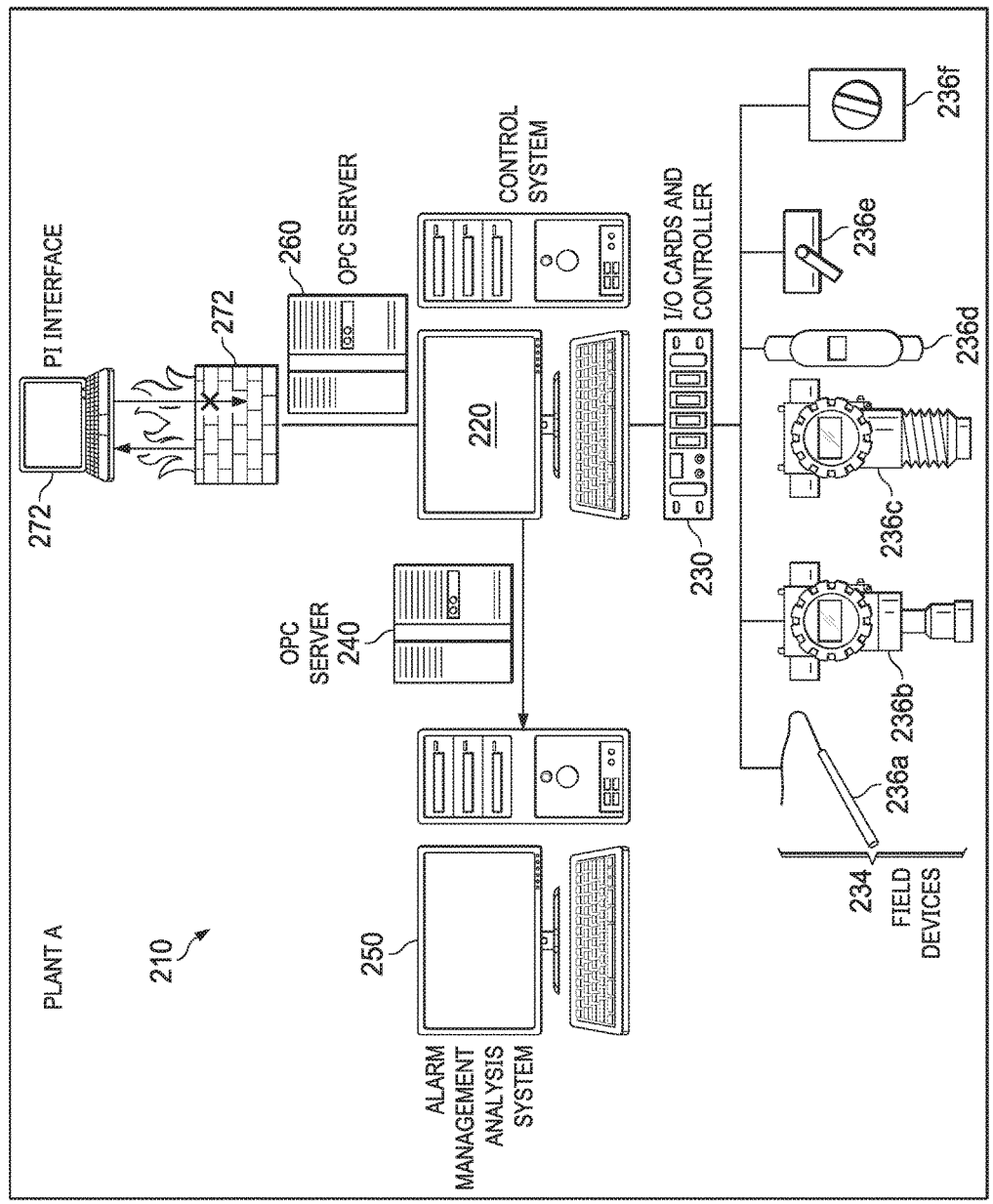
FIG. 2 illustrates an embodiment of an individual ALMS system set up to monitor a particular operating plant further configured with a connection to a PI interface to a Process Automation System ("PAS").

Referring to FIG. 2, an embodiment of an individual ALMS system 210 set up to monitor a particular operating plant is shown. In this embodiment, certain components from the FIG. 1 prior art system are configured. A control system 220 connects to an input/output ("I/O") cards and controller bank 230. The I/O cards and controller bank 230 can then connect to a wide variety of I/O field devices 234 that can be configured in a particular plant. In an alternative embodiment, the I/O cards and controller can be integrated into the control system 220. In an embodiment, the controller and I/O ports can also be configured on a single card. In an embodiment, and as shown in the example embodiment illustrated by FIG. 2, the field devices 234 can include a variety of sensors and devices such as a temperature sensor 236a, a pressure sensor 236b, a level sensor 236c, a flow sensor 236d, a valve 236e, and a switch 236f. A wide variety of other devices or sensors can also be configured as part of an ALMS or a system may be configured with one or more of the same device or sensor type. The control system 220 can be configured to connect to a first OPC Server 240 and a second OPC Server 260. In an embodiment, an OPC server can comprise one or more separately configured pieces of hardware running an OPC Server software program, though an OPC Server is often more simply configured as a software program that can run on the control system 220 or on an alarm management analysis system 250. The first OPC Server 240 converts field device I/O information into open source OPC protocol information that can be understood by a wide variety of computer programs including the types of programs that can be run on the alarm management analysis system 250. The second OPC Server 260 is also configured to convert field device I/O information into open source OPC protocol information, which can then be communicated to a plant network PI Interface 270 via a communications network 272. PI Interface 270 part of a Process Automation System ("PAS") such as Distributed Control Systems ("DCSs") and Supervisory Control and Data Acquisition ("SCADA)" that can be observed in the PI.

Figure 3:
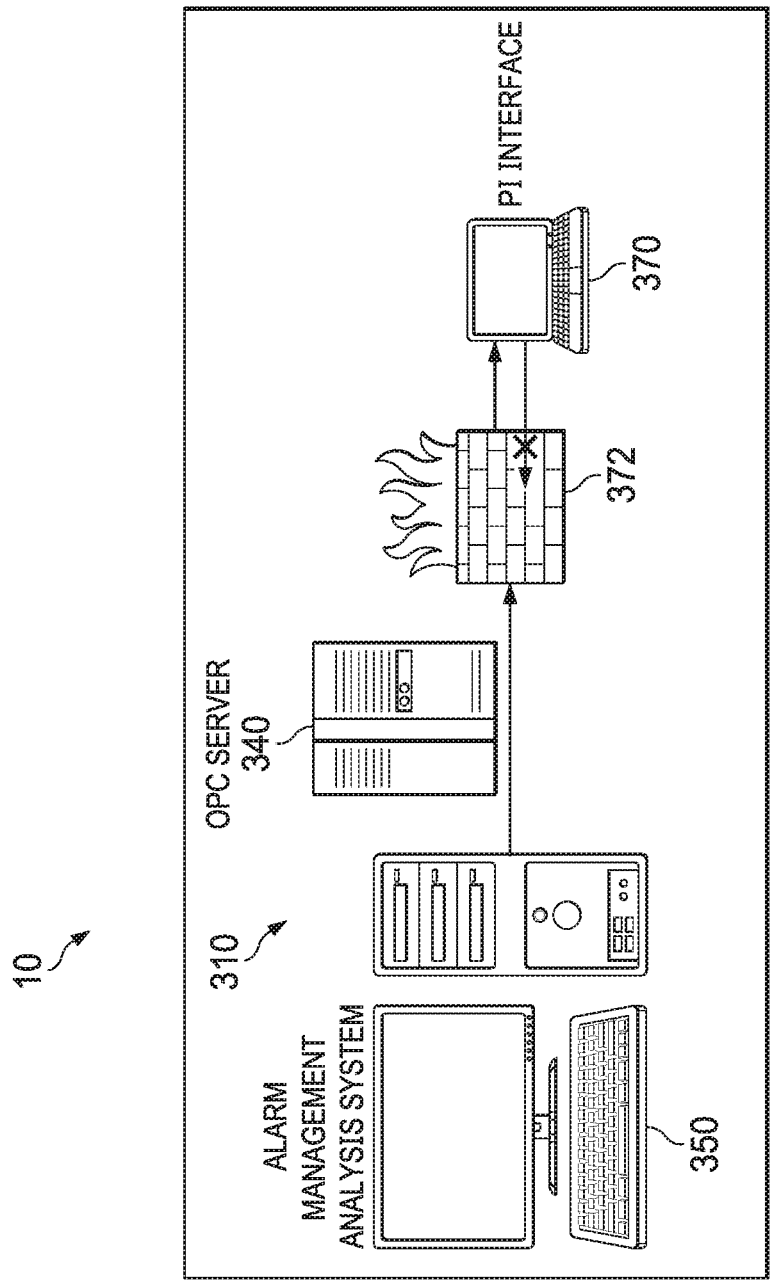
FIG. 3 illustrates an embodiment of an individual ALMS Alarm Analysis System configured to communicate data with an OPC Server that converts the ALMS alarm analysis system data to OPC protocol data. This system is further configured to relay the OPC protocol data to a PI Interface.

Referring to FIG. 3, an embodiment of an individual ALMS 310 having an Alarm Analysis System 350 that is configured to communicate data to an OPC Server 340 that converts the alarm analysis system data to OPC protocol data. The alarm management system data may originate in a number of data protocols/formats, which can include SQL database and can communicate using OPC protocol. This system is further configured to relay the OPC protocol data from the OPC Server 340 to a PI Interface 370.

FIG. 3 illustrates a new mechanism based on PI communication with ALMS. This can be achieved by establishing a new connection with an OPC server/client, which can convert the data to OPC protocol data and help PI system to understand the data generated by ALMS system. In an embodiment, the PI system will identify ALMS system based on an IP address and data source. In an embodiment, different categories of alarm KPIs can be configured in ALMS and each KPI has a unique data source. In an embodiment, four categories of alarm KPIs can be tracked and relayed, including Alarm Rate, Chattering Alarm, Standing Alarm, and Suppressed Alarm. The generated report will cover each of these alarm KPI's and each unit within operating plant. Plant personal that have access to PI system will then be able to observe the performance of particular plant by searching for specific alarm KPI. With this system and configuration, the alarm KPI can be available as part of the plant network level where the various control systems can be connected together in a network.

Figure 4:
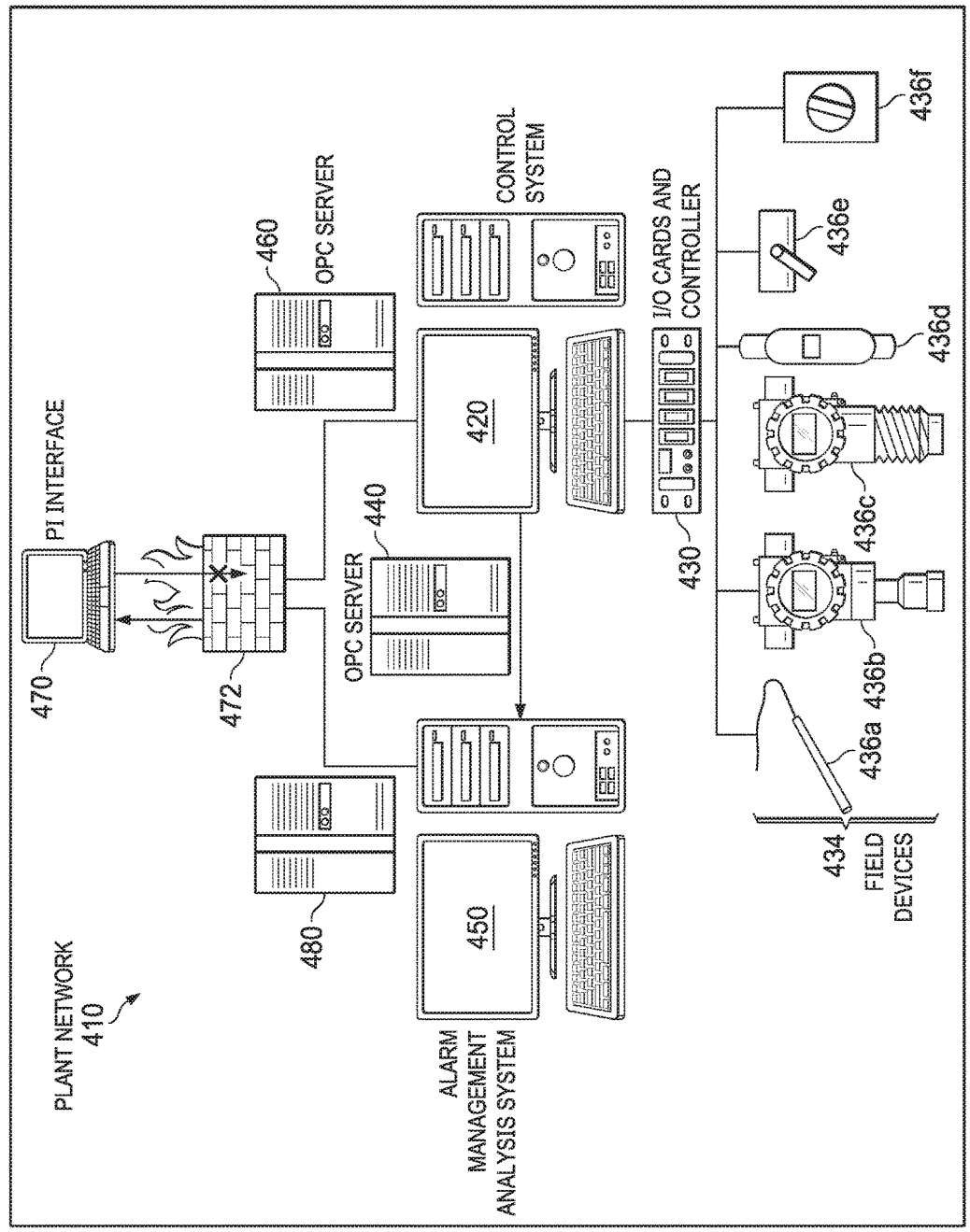
FIG. 4 illustrates an embodiment of a Plant Network System that comprises an individual ALMS Alarm Analysis System configured to communicate with an ALMS Control System and a PI Interface System through OPC Servers that converts the communicated data to OPC protocol data. This system is further configured to relay the OPC protocol data from the ALMS Alarm Analysis System and from the ALMS Control System to a PI Interface.

Referring to FIG. 4 an embodiment of a Plant Network System that comprises an individual ALMS Alarm Analysis System configured to communicate with an ALMS Control System and a PI Interface System through OPC Servers that converts the communicated data to OPC protocol data is shown. This system is further configured to relay the OPC protocol data from the ALMS Alarm Analysis System and from the ALMS Control System to a PI Interface. Referring to FIG. 4, a control system 420 connects to an input/output ("I/O") cards and controller bank 430. The I/O cards and controller bank 430 can then connect to a wide variety of I/O field devices 434 that can be configured in a particular plant. In an alternative embodiment, the I/O cards and controller can be integrated into the control system 420. In an embodiment, and as shown in the example embodiment illustrated by FIG. 4, the field devices 434 can include a variety of sensors and devices such as a temperature sensor 436a, a pressure sensor 436b, a level sensor 436c, a flow sensor 436d, a valve 436e, and a switch 436f. A wide variety of other devices or sensors can also be configured as part of an ALMS or a system may be configured with one or more of the same device or sensor type. The control system 420 can be configured to connect to a first OPC Server 440 and a second OPC Server 460. In an embodiment, an OPC server can comprise one or more separately configured pieces of hardware running an OPC Server software program, though an OPC Server is often more simply configured as a software program that can run on the control system 420 or on an alarm management analysis system 450. The first OPC Server 440 converts field device I/O information into open source OPC protocol information that can be understood by a wide variety of computer programs including the types of programs that can be run on the alarm management analysis system 450. The second OPC Server 460 is also configured to convert field device I/O information into open source OPC protocol information, which can then be communicated to a plant network PI Interface 270 via a communications network 472. PI Interface 270 is part of a Process Automation System ("PAS") such as Distributed Control Systems ("DCSs") and Supervisory Control and Data Acquisition ("SCADA") that can be observed in the PI.

In general, FIG. 4 shows the complete structure of PI interface within plant network level. In the described and illustrated embodiment, the PI will receive two kinds of data: the process data, as it would in a traditional system, and the alarm KPIs, which are configured to be communicated to the PI interface as part of this system. In an embodiment, the PI will communicate with the two systems using separate OPC servers. One OPC dedicated for process data and connected directly to PAS system. In an embodiment, the second OPC server 480 will be used to connect the PI 470 with the ALMS 450, the PI 470 will be configured to display, log, and communicate (depending on the embodiment) specific KPIs from alarm analysis system in a regular basis.

Figure 5:
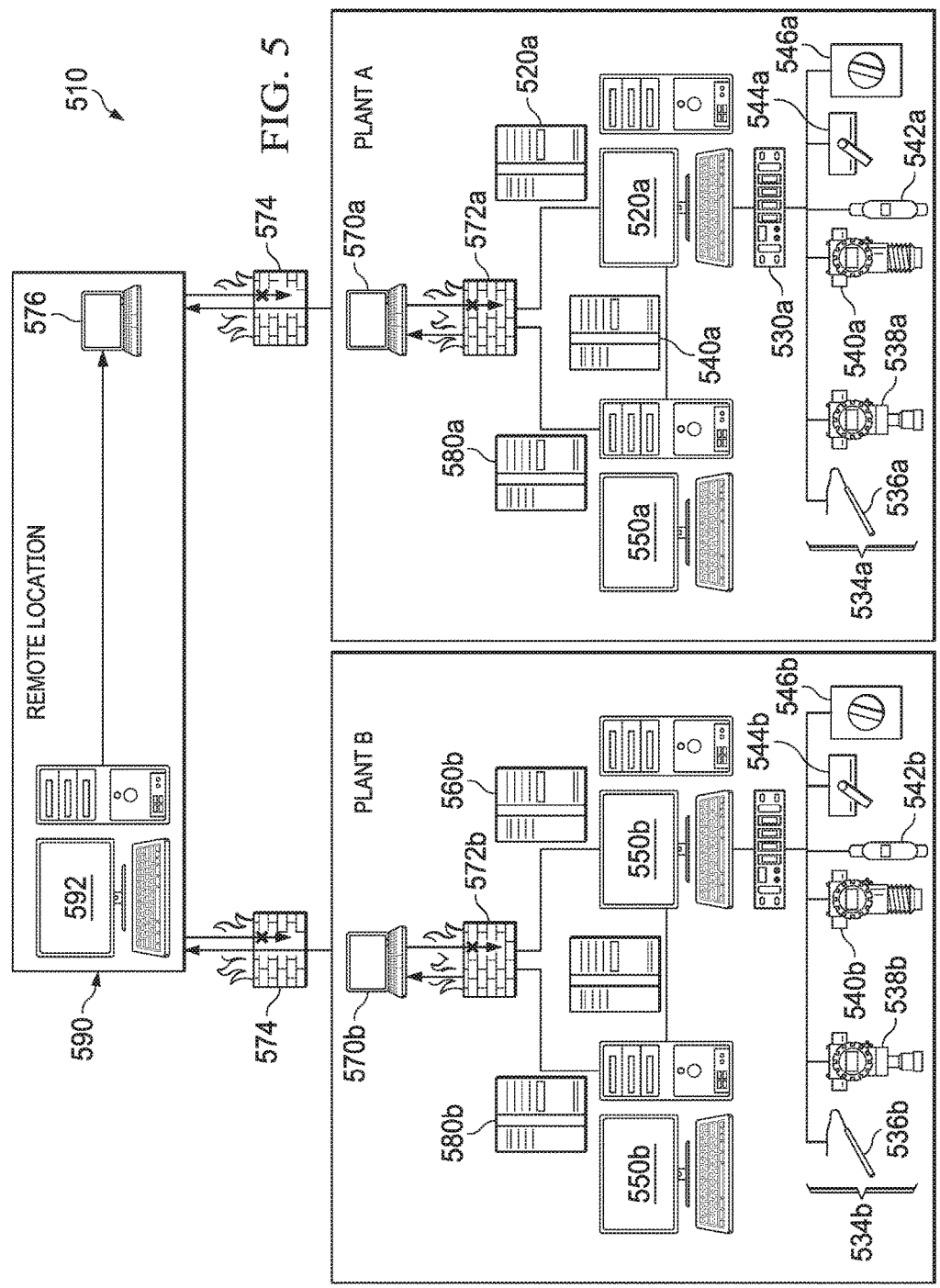
FIG. 5 illustrates an embodiment showing multiple Plant Network Systems of the type illustrated in FIG. 4, wherein each Plant Network System communicates over an IT Network to a Corporate PI System at a remote location. In an embodiment, the Corporate PI System is further configured to connect to an Alarm Engineering Center for display to and interaction from corporate end users.

Referring to FIG. 5 an embodiment of a Corporate Level Alarm Monitoring and Analysis System 510 showing multiple plant network systems of the type illustrated in FIG. 4, wherein each plant network system communicates over an IT network to a corporate PI system at a remote location is shown and described below. This system is further configured to relay the OPC protocol data from the ALMS alarm analysis system and from the ALMS control system to a PI interface. Referring to the systems of both Plant A (numeric labels ending in "a") and Plant B (numeric labels ending in "b") of FIG. 5, a control system 520a, 520b connects to an input/output ("I/O") cards and controller bank 530a, 530b. The I/O cards and controller bank 530a, 530b can then connect to a wide variety of I/O field devices 534a, 534b that can be configured in a particular plant. In an alternative embodiment, the I/O cards and controller can be integrated into the control system 520a, 520b. In an embodiment, and as shown in the example embodiment illustrated by FIG. 5, the field devices 534a, 534b can include a variety of sensors and devices such as a temperature sensor 536a, 536b; a pressure sensor 538a, 538b; a level sensor 540a, 540b; a flow sensor 542a, 542b; a valve 544a, 544b; or a switch 546a, 546b. A wide variety of other devices or sensors can also be configured as part of an ALMS or a system may be configured with one or more of the same device or sensor type. The control system 520a, 520b can be configured to connect to a first OPC Server 540a, 540b and a second OPC Server 560a, 560b. In an embodiment, an OPC server can comprise one or more separately configured pieces of hardware running an OPC Server software program, though an OPC Server is often more simply configured as a software program that can run on the control system 520a, 520b or on an alarm management analysis system 550a, 550b. The first OPC Server 540a, 540b converts field device I/O information into open source OPC protocol information that can be understood by a wide variety of computer programs including the types of programs that can be run on the alarm management analysis system 550a, 550b. The second OPC Server 560a, 560b is also configured to convert field device I/O information into open source OPC protocol information, which can then be communicated to a plant network PI Interface 570a, 570b via a communications network 572a, 572b. PI Interface 570a, 570b is part of a process automation system ("PAS") that can be observed in the PI. In an embodiment, each plant system PI Interface 570a, 570b is further configured to communicate alarm information and other pertinent information over an IT network 574 to a corporate PI server 576 at a remote location. The corporate PI server 576 can further be configured to communicate alarm and other related information to a corporate alarm engineering center computer system 592 for display to corporate personnel. In an embodiment, the corporate level system 590 includes the corporate PI server 576 and corporate alarm engineering center computer system 592.

FIG. 5 generally represents one example second stage embodiment of this system and serves to connect multiple PI interfaces from plant network levels into a centralized location. In an embodiment, the PI configuration in each plant will be repeated again in corporate PI to map the data in the field with the alarm engineering center. Life alarm data from different plants can be observed in the alarm engineering solution center, depending on the configuration of the system. In an embodiment, a centralized dashboard can be configured to cover the performance of operating plants against standards alarm KPIs. The center can monitor the performance on a regular basis or regular interval and provide recommendations to enhance the safety and reliability within the plant level for a particular plant based on pre-programmed performance parameters or based on comparison with performance information from other plants. As shown in FIG. 5, the alarm KPIs can be generated in ALMS and connected to PI at the plant level. In an embodiment. the alarm KPIs can be transferred from each plant network over an IT network and received in the corporate PI. This process can be used in each operating plants. The consolidated alarm KPIs from the field can then be used to develop the ALMS Dashboard for display to corporate personnel.

Figure 6:
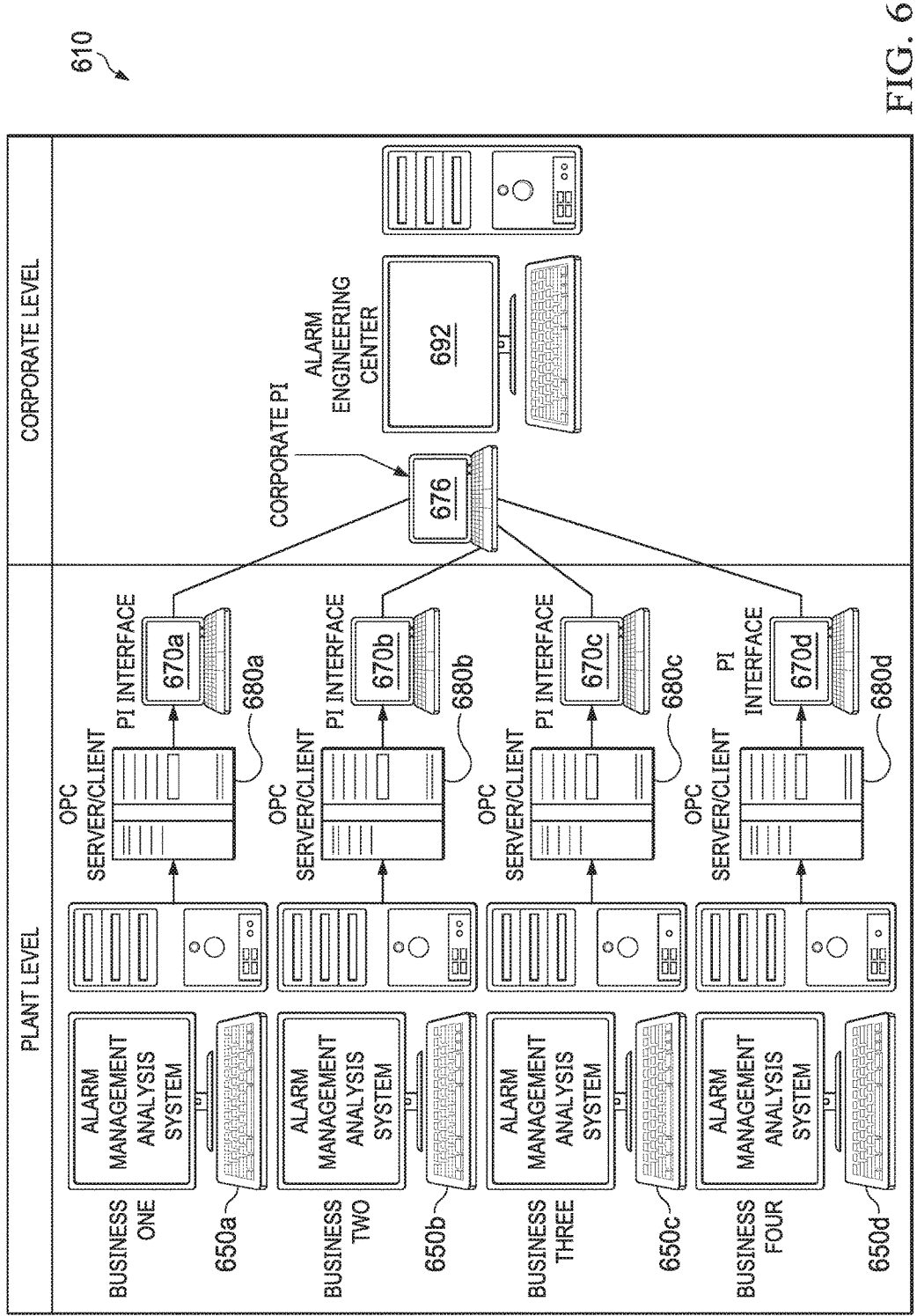
FIG. 6 illustrates an embodiment showing one possible setup of multiple Plant Network Systems including ALMS Alarm Analysis Systems configured to communicate with a central Corporate PI System. In an embodiment, the Corporate PI System is further configured to connect to an Alarm Engineering Center for display to and interaction from corporate end users.

Referring to FIG. 6, an embodiment of a corporate scale alarm management system 610 having multiple plants is shown. This system 610 provides an example of one possible corporate scale setup of the system described herein where multiple plant network systems including multiple individual ALMS alarm analysis systems 650a, 650b, 650c, and 650d are configured to communicate with a single central corporate PI system 676. In this embodiment, the corporate PI system 676 is further configured to connect to an Alarm Engineering Center 692 for display to and interaction from corporate end users. Further, each of the alarm analysis systems are configured to convey alarm data and alarm related information to OPC Server/Clients 680a, 680b, 680c, and 680d that each then convey the alarm data and alarm related information to PI interface systems 670a, 670b, 670c, and 670d that are configured at each respective plant. Each PI interface system is then configured to relay and convey the alarm data and alarm related information to the single central corporate pi system 676.

In an embodiment, of the above-described system, multiple corporate central PI systems can be configured to receive information from respective plant level PI systems. In a further embodiment of this configuration, the corporate central PI systems can then covey information to one alarm engineering center systems or multiple alarm engineering center systems.

In an embodiment, various control systems are configured to generate alarms as there are equipment malfunctions, process deviations, or abnormal conditions as detected by the sensors. These alarms are collected by alarm management system for future analysis.

As shown in FIG. 6, alarm KPIs can be generated by using four (4) types of alarm analysis software. which can include the following types of software among others: Delta V Analyze Software developed by Emerson Company, PlantState Suite Software developed by PAS Company, Exaquantum & ARA Software developed by Yokogawa Company, and DynAMo Software developed by Honeywell Company. Each plant can be configured to use one of the above software packages to generate the alarm KPIs at a given plant. One plant can also be configured with multiple alarm KPI software systems or other KPI software systems that have not been listed.

In an embodiment, the alarm data is stored on the alarm management system and based on that data the alarm KPIs are analyzed and calculated. Also, in an embodiment, the corporate PI system can collect and store the alarm KPIs data that are communicated to the PI system via OPC.

In an embodiment, one or more of each of the control system, alarm management analysis system, local plant PI interface system, corporate PI system, or alarm engineering center system can log and store alarm data and alarm related information. In an embodiment, the date range of data logged and stored can be limited to preserve memory. Further, certain systems can be configured to relay information between connected systems at pre-set time intervals such that a constant communication link is not required between each of the respective systems. In an embodiment, certain systems can be configured to relay information between connected systems in real-time or in real-time with minimal delays such that the information presented to an end user is as accurate as possible at any given time.

The above disclosure is meant to be illustrative of the various embodiments of the present invention. Various modifications will become apparent to those skilled in the art once the disclosure is considered as a whole.

The invention claimed is:

1. A plant alarm management system comprising:
an alarm management analysis computer system,
a control computer system further comprising:
  one or more input/output cards configured with an input/output controller; and
  multiple field devices, each including sensors to detect plant conditions, each of the one or more field devices configured to communicate data regarding plant state to the one or more input/output cards configured as part of the control computer system, and
a PI interface computer system configured to be in a communication channel over a network with each of the alarm management system and the control computer system.

2. The plant alarm management system of claim 1, wherein the communication channel between the alarm management analysis computer system and the control computer system comprises an OPC server.

3. The plant alarm management system of claim 1, wherein the communication channel between the alarm management analysis computer system and the PI interface computer system comprises an OPC server.

4. The plant alarm management system of claim 1, wherein the communication channel between the control computer system and the PI interface computer system comprises an OPC server.

5. The plant alarm management system of claim 1, wherein the communication channel between the control computer system and the PI interface computer system comprises a first OPC server and wherein the communication channel between the alarm management analysis computer system and the PI interface computer system comprises a second OPC server and wherein the communication channel between the alarm management analysis computer system and the control computer system comprises a third OPC server.

6. The plant alarm management system of claim 1, wherein multiple field devices, each including sensors to detect plant conditions, can include one or more of each of the following field device types: a temperature sensor, a pressure sensor, a level sensor, a flow sensor, a valve, a switch.

7. A corporate level plant alarm management system comprising:
multiple separate plant level alarm management systems, each separate plant level alarm management system comprising:
  an alarm management analysis computer system,
  a control computer system further comprising:
    one or more input/output cards; and
    multiple field devices, each including sensors to detect plant conditions, each of the one or more field devices configured to communicate data regarding plant state to the one or more input/output cards configured as part of the control computer system, the control system further configured to store state data for each of the multiple field devices, and
  a PI interface computer system configured to be in a communication channel over a network with each of the alarm management system and the control computer system.

8. The corporate level plant alarm management system of claim 7, wherein each of the separate plant level alarm management systems are configured to communicate alarm data and alarm related information over an IT network to a corporate PI system configured at a remote location.

9. The corporate level plant alarm management system of claim 8, wherein the corporate PI system is configured to communicate alarm data and alarm related information to an alarm engineering center system for organization and display of the alarm data and alarm related information.

10. The corporate level plant alarm management system of claim 7, wherein for each of the respective separate plant alarm management systems, the communication channel between the control computer system and the PI interface computer system comprises a first OPC server and wherein the communication channel between the alarm management analysis computer system and the PI interface computer system comprises a second OPC server and wherein the communication channel between the alarm management analysis computer system and the control computer system comprises a third OPC server.

11. The corporate level plant alarm management system of claim 7, wherein for each of the respective separate plant alarm management systems, the multiple field devices, each including sensors to detect plant conditions, can include one or more of each of the following field device types: a temperature sensor, a pressure sensor, a level sensor, a flow sensor, a valve, or a switch.

12. A plant alarm management system comprising:
an alarm management analysis computer system,
a control computer system further comprising:
one or more input/output cards configured with an input/output controller; and
multiple field devices, each including sensors to detect plant conditions, each of the one or more field devices configured to communicate data regarding plant state to the one or more input/output cards configured as part of the control computer system, and
a PI interface computer system configured to be in a communication channel over a network with each of the alarm management system and the control computer system,
the communication channel between the control computer system and the PI interface computer system is configured to direct alarm data and alarm related information through a first channel OPC server,
the communication channel between the alarm management analysis computer system and the PI interface computer system is configured to direct alarm data and alarm related information through a second alternate channel of the same OPC server, and
the communication channel between the alarm management analysis computer system and the control computer system is configured to direct alarm data and alarm related information through a third channel of the same OPC server.

13. The plant alarm management system of claim 12, wherein multiple field devices, each including sensors to detect plant conditions, can include one or more of each of the following field device types: a temperature sensor, a pressure sensor, a level sensor, a flow sensor, a valve, or a switch.

* * * * *